Sept. 4, 1951  A. H. LEWIS  2,566,670
FLASH WELDER
Filed Jan. 26, 1950  7 Sheets-Sheet 2

INVENTOR.
Alfred H. Lewis.
BY
Everett G. Wright
ATTORNEY.

Sept. 4, 1951

A. H. LEWIS

2,566,670

FLASH WELDER

Filed Jan. 26, 1950

Patented Sept. 4, 1951

2,566,670

UNITED STATES PATENT OFFICE 2,566,670

FLASH WELDER

Alfred H. Lewis, Huntington Woods, Mich., assignor to Swift Electric Welder Company, a corporation of Michigan Application January 26, 1950, Serial No. 140,697

8 Claims. (Cl. 219—4)

This invention relates to flash welders and in particular to improvements in semi-automatic flash welders wherein accurate automatic control of flashing speed, amount of flash, upset pressure and the amount of upset is accomplished.

It is recognized in flash welding that uniform and consistently satisfactory welds can be obtained only by close control of flashing speed, amount of flash, upset pressure and the amount of upset. In manually operated flash welders, the most experienced operators will vary the foregoing factors from weld to weld with the result that inconsistencies in the quality and strength of the welds occur.

The primary object of this invention is to provide a flash welder including semi-automatic controls therefor which eliminate the human error in flash welding and thereby accomplish welds of uniform high quality and strength.

Another object of the invention is to provide a semi-automatic flash welder wherein the control of flashing speed, amount of flash or flashing distance, upset pressure and amount of upset is fully automatic, all without the normal inflexibility of set-up and control usually associated with present cam operated flash welders.

Another object of the invention is to provide a semi-automatic flash welder which has the welding range and flexibility of present manually operated flash welders, which automatically controls the critical portion of the welding cycle, and which is also under the full manual control of the operator at all times.

A further object of the invention is to provide a semi-automatic flash welder which accommodates a wide range of work and on which various production welding jobs may be easily and readily set-up, which employs manual starting of the welding cycle and fully automatic control of flashing speed, amount of flash, upset pressure and amount of upset with available manual interruption and continuation of the welding cycle by operator control in the event a weld should stick or flash improperly due to imperfectly prepared work pieces being welded or due to welding current fluctuation caused by power supply variations.

Other objects of the invention will become apparent by reference to the following detailed description taken in connection with the accompanying drawings, in which:

Fig. 7 is an enlarged end elevational view of the welding control mechanism shown in Figs. 5 and 6.

Referring now to the drawings wherein like numerals refer to like and corresponding parts throughout the several views, the particular flash welder embodying the invention shown for illustrative and not limiting purposes comprises, in general, a base 20 onto which a fixed platen 21 is secured in insulated relationship with insulation 22 interposed therebetween and onto which a movable platen 23 is slidably mounted on longitudinal ways 24, a welding transformer 25 having its primary winding 26 connected through suitable controls to a source of alternating current and its secondary connected to the fixed platen 21 by a rigid connector 27 connected to one secondary pad 28 and to the movable platen 23 by flexible connectors 29 connected to the other secondary pad 30, electrodes 31 and 33 on the fixed and movable platens 21 and 23 respectively, work holding means 32 and 34 adapted to clamp work pieces W to be welded together onto the electrodes 31 and 33 respectively, a combined air-hydraulic power unit 35 pivotally mounted in the base 20 with its piston rod 36 connected by suitable linkage 37 to the movable platen 23 which moves the said movable platen 23 toward and away from the fixed platen 21, and semi-automatic control means generally designated by the numeral 75 hereinafter described in detail which provides automatic accurate control of the flashing speed, amount of flash or flashing distance, upset pressure and amount of upset responsive to manual initiation of the welding cycle but which may be manually interrupted and reversed at any stage of the welding cycle.

The air-hydraulic power unit 35 consists of a housing 38 pivotally connected to the base 20 of the welder at the longitudinal center thereof by means of transversely disposed pivots 39. In the housing 38 of the power unit 35 is an air cylinder 40, an oil cylinder 41 and a dual piston 42 having a large air head 44 reciprocating in the air cylinder 40 and a smaller oil head 45 reciprocating in the oil cylinder 41, the piston rod 36 being connected to the oil head 45 of the dual piston 42 and extends axially outward from the oil cylinder 41. Around the oil cylinder 41 is preferably cast an oil reservoir 46. The operation of the air-hydraulic power unit is responsive to the semi-automatic control means 75 and will be fully described later, however, at this point, it will be observed that movement of the piston rod 36 of the power unit 35 moves the movable platen 23 toward and away from the fixed platen 21 by means of the linkage 37.

The said linkage 37 comprises a double lever 43 pivotally connected to the base 20 of the welder on a transverse pivot pin 47. The upper end of the said double lever 43 is bifurcated and is pivotally connected to a bifurcated bracket 230 extending upwardly from the center of the movable platen 23 by means of a link 48 and pivot pins 49 and 50. The lower end of the double lever 43 is also bifurcated and has mounted therein on a transverse pivot pin 51 a take-up block 52 through which the threaded end 360 of the piston rod 36 extends. By means of take-up nuts 53 and 54 and lock nuts 55 and 56, the desired adjustment between the piston rod 36 and the linkage 37 may be accomplished. The adjustment of the piston rod 36 in the take-up block 52 determines the limit of forward travel of the movable platen 23 because the head flange 450 of the oil head 45 of the dual piston 42 from which the piston rod 36 extends serves as a stop acting against the inside of the end of the oil cylinder 41. Adjustment of the piston rod 36 is made for the purpose of limiting the amount of upset of work W. An adjustable stop 57 in the form of a threaded stop rod is threaded through the double lever 43 just above the take-up block 52 and is maintained in its adjusted position by a lock nut 58. The said adjustable stop 57 contacts a pad 59 on the base 20 and limits the outward travel of the movable platen 23 and thus prevents any unnecessary opening between the electrodes 31 and 33 and the work W held thereonto by the work holding means 32 and 34.

The work holding means 32 and 34 may be either hydraulic as indicated or may be any desired type of clamping means, and, inasmuch as the work holding means 32 and 34 are not a part of this invention, they will not be described in detail.

However, as an indication of one of various types of work holding means that may be employed, the work holding means 32 and 34 each consists of a work clamp 60 fixed onto one end of a pressure lever 61 by a link pin 62, which pressure lever 61 is pivoted by a pivot 63 to spaced brackets 64 and 65 upwardly extending from a base 66 secured to one of the platens 21 and 23. The other end of the pressure lever 61 is connected by a link pin 67 to the piston rod 68 of a hydraulic cylinder 69 pivotally connected at its lower end by a pivot pin 70 to a U-shaped bracket 71 preferably formed integral with the spaced brackets 64 and 65 and the pad 66. An adjustable stop 72 threaded through the lever 61 fixed in its adjusted position by a lock nut 73 contacts a contact pad 74 disposed between the spaced brackets 64 and 65 to limit the extent to which the hydraulic cylinder 69 may lift the work clamp 60 off the work W positioned on the electrode 31 or 33. As before stated, the means for holding or clamping work W to the electrodes 31 and 33 is optional as well as the power or manual means for accomplishing the operation of the said work holding or clamping means.

Figure 12:
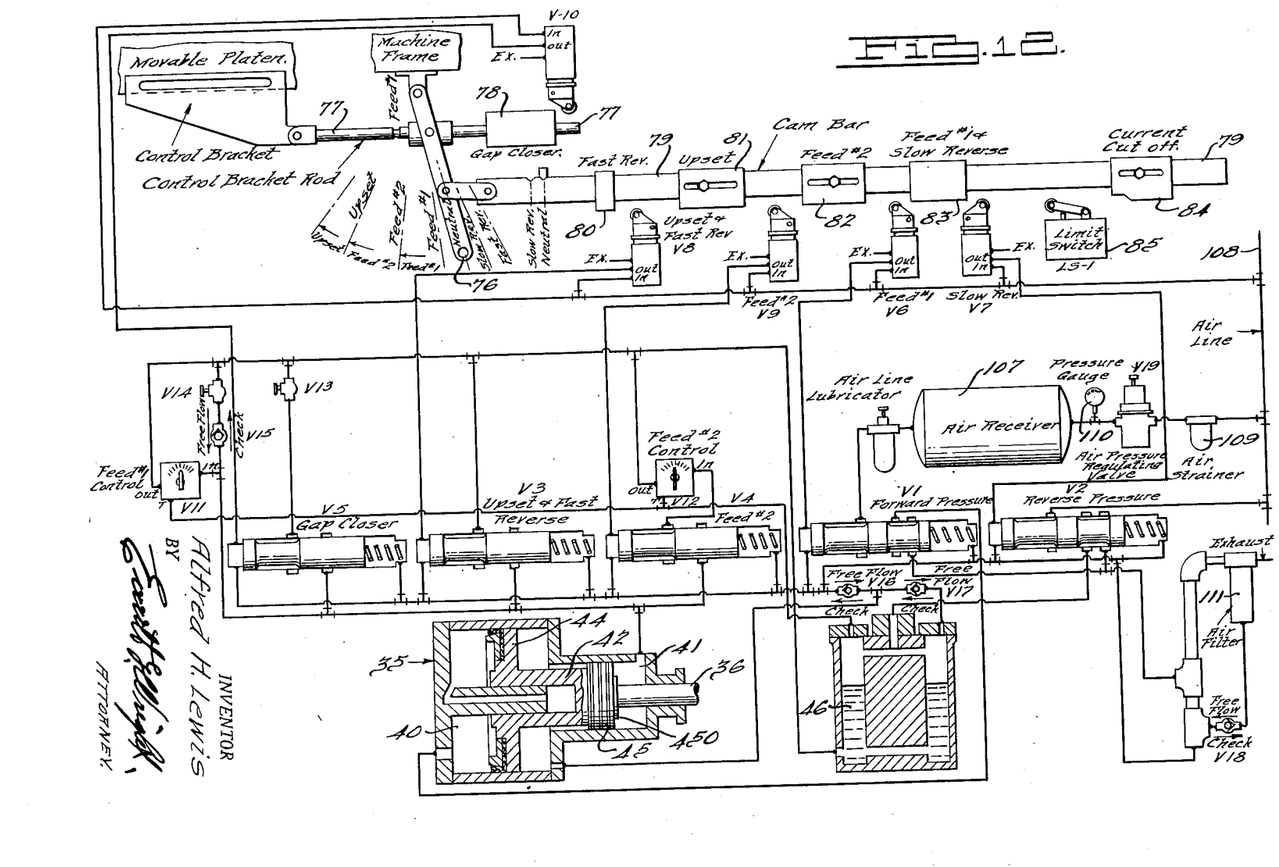
Fig. 12 is a welding control mechanism diagram.
Figure 13:
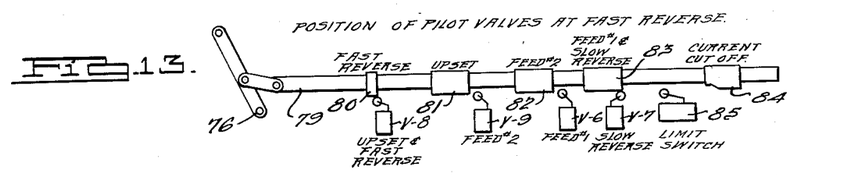
Fig. 13 is a diagrammatic view showing the welding control cam bar and pilot valves at fast reverse position.
Figure 14:
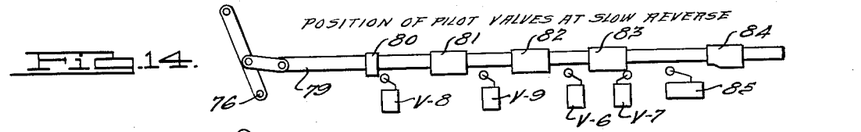
Fig. 14 is a diagrammatic view showing the welding control cam bar and pilot valves at slow reverse position.
Figure 15:
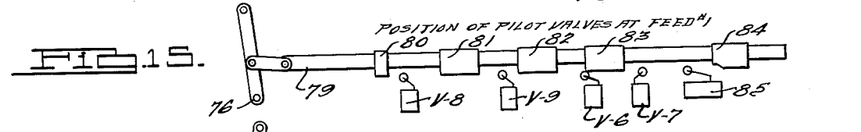
Fig. 15 is a diagrammatic view showing the welding control cam bar and pilot valves at feed No. 1 position.

Referring now particularly to the control means generally designated by the numeral 75 in Figs. 1, 2, 3 and 4, disclosed in detail in Figs. 5, 6, 7, 8, 9, 10 and 11, and shown diagrammatically in Figs. 12–18 inclusive, the said control means 75 consists generally of an operating lever 76, a swingable cam bar 77 having a gap closer cam 78 adjustably mounted thereon, a sliding cam bar 79 having a fast reverse cam 80, an upset cam 81, a feed No. 2 cam 82, a feed No. 1 and slow reverse cam 83, and a current cut-off cam 84 all adjustably mounted thereon, control valves V-1 through V-19 inclusive hereinafter described in detail of which V-1 through V-5 inclusive are preferably located in a valve assembly adjacent the welding machine, V-6 through V-10 inclusive and a current cut-off limit switch 85 are mounted on the welding machine in operable position under the cam bars 77 and 79, V-11 and V-12 are mounted on the front of the welding machine, and V-13 to V-19 inclusive are mounted in the piping of the machine air and hydraulic circuits as shown in Fig. 12. The current cut-off cam 84 is suspended from an L-shaped cantilever plate 840 secured to the top of the sliding cam bar 79. The electric control for the welding circuit is operated from a black or "start" push button 86, a red or "shut-off" push button 87, and the current cut-off limit switch 85 through a suitable circuit as indicated diagrammatically in Fig. 19 and hereinafter described in detail, the said "start" and "shut-off" push buttons 86 and 87 being conveniently mounted on the operating lever 76 near the hand grip thereof.

Figures 9, 10:
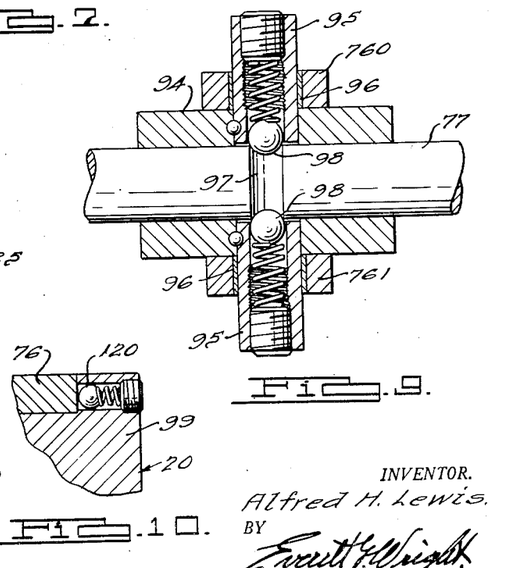
Fig. 9 is a detailed longitudinal sectional view taken on the line 9—9 of Fig. 5.
Fig. 10 is a detailed cross sectional view taken on the line 10—10 of Fig. 5.

The operating lever 76 of the control mechanism 75 is preferably composed of spaced upper and lower bars 760 and 761 and supported at its inner end from a pivot 88 vertically disposed in a bracket 89 fixed to the base 20 of the welding machine. The swingable cam bar 77 is pivoted from the movable platen 23 by a pivot 90 vertically disposed in a bracket 91 secured to the movable platen 23 by suitable studs 92 extending through a slotted aperture 93 in the bracket 91 whereby to permit longitudinal adjustment of the bracket 91 and the pivot 90 carried thereby with respect to the movable platen 23. The swingable cam bar 77 is disposed between the upper and lower bars 760 and 761 of the operating lever and is slidably and swingably connected thereto by means of a sleeve 94 having hollow pins 95 extending upwardly and downwardly therefrom journaled through the said operating lever bars 760 and 761 by suitable bearings 96, see Fig. 9. The swingable cam bar 77 is grooved at 97 to accommodate spring loaded ball detents 98 disposed in the hollow pins 95 journaled to the operating lever bars 760 and 761 as shown in Fig. 9 which engage the said swingable cam bar 77 whereby to cause the said swingable cam bar 77 to move the operating lever 76 about its pivot 88 responsive to movement of the platen 23, the said ball detents 98 permitting manual movement of the operating lever 76 if and when the operator moves it, for example, to the extreme right position as viewed in Figs. 5 and 12, in which position the welding machine would operate in its fast reverse cycle and the movable platen 23 would move rapidly to the right as viewed in Figs. 1 and 5 until the stop 57 contacts the contact pad 59.

The sliding cam bar 78 is reciprocatingly mounted in a block 99 cast integral with the base 20 and a block 100 cast integral with outer end 1010 of the bracket 101 extending longitudinally from the base 20. Keepers 990 and 1000 maintain the said sliding cam bar 78 in the blocks 99 and 100 respectively. The inner end of the sliding cam bar 78 is pivotally connected to the operating lever 76 by means of a link block 102 and pivots 103 and 104, thus causing the sliding cam bar 78 to reciprocate responsive to movement of the operating lever 76. A stop 105 is provided at the outer end of the sliding cam bar 79 which contacts the keeper 1000 and limits the inward movement of the sliding cam bar 79.

Figure 5:
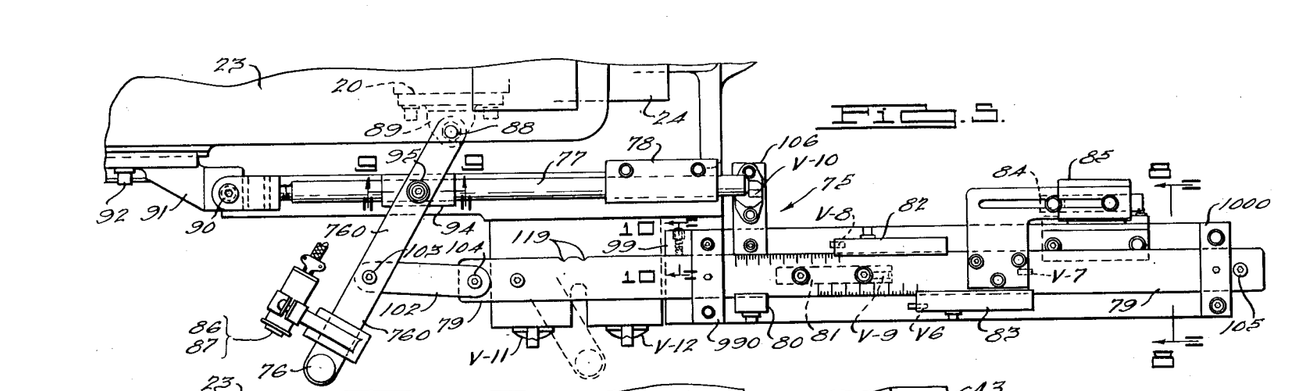
Fig. 5 is an enlarged plan view of the semi-automatic welding control mechanism preferably employed.
Figure 6:
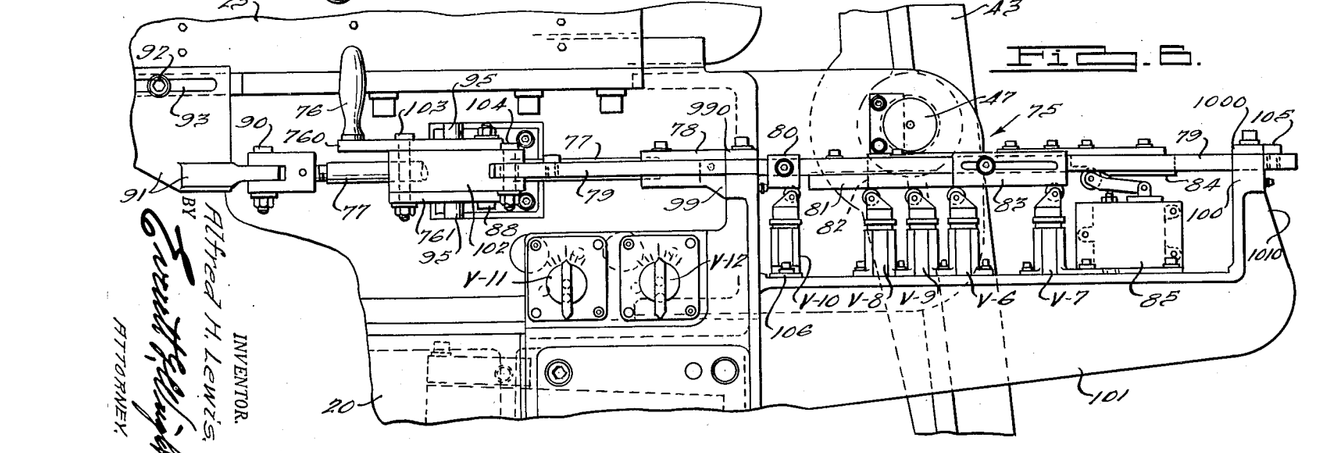
Fig. 6 is an enlarged side elevational view of the welding control mechanism shown in Fig. 5.
Figure 8:
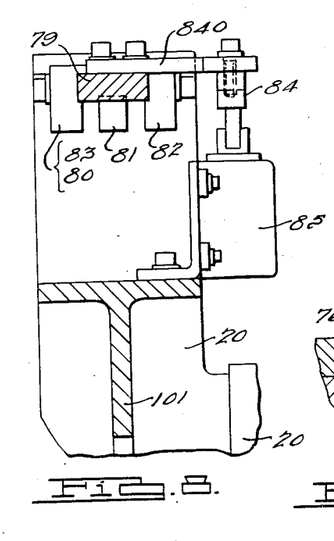
Fig. 8 is a detailed cross sectional view taken on the line 8—8 of Fig. 5.

On the bracket 101 are mounted a series of cam operated valves V-6 through V-10 inclusive employed to control the functions of the welding machine and a current cut-off limit switch 85. From left to right as viewed in Figs. 5 and 6 are V-10, V-8, V-9, V-6 and V-7 and the current cut-off limit switch 85, all mounted on the bracket 101 under the fast reverse cam 80, upset cam 81, feed No. 2 cam 82, feed No. 1 and slow reverse cam 83 and current cut-off cam 84 respectively carried by the sliding cam bar 78 except valve V-10 which is mounted on an arm 106 extending rearwardly from the bracket 101 to support the said valve V-10 under the gap closer cam 78 which is adjustably mounted on the swingable cam bar 77. It will be noted that each of the said cams are longitudinally adjustable on the cam bar supporting it, thereby providing complete flexibility of the operating cycle of the welding machine whereby to enable it to accomplish the flash welding of many and varied types and classes of work to be welded together without special cams. In Fig. 11 is illustrated the top of a cam operated pilot valve, V-6 being typical, having a spring loaded bifurcated lever 125 into which is journaled on a pin 126 a cam follower 127 which is contacted by a cam, the feed No. 1 and slow reverse cam 83 being typical, to operate the pilot valve. Obviously, any suitable cam operated pilot valves may be employed.

As before described, the movement of the platen of the welding machine is accomplished by an air-hydraulic power unit 35 having a large air cylinder 40 and a smaller oil cylinder 41 and a dual piston 42 having two heads, a large air head 44 reciprocating in the air cylinder 40 and a smaller oil head 45 reciprocating in the oil cylinder 41. The oil cylinder 41 is connected to the oil reservoir 46 which, although shown preferably cast around the oil cylinder 41 in Fig. 4, may be a separate unit as indicated in Fig. 12. On the side of the welder is mounted an air receiver 107.

The air operated hydraulically controlled movement of the movable platen 23 by the air-hydraulic power unit 35 is operated by compressed air from any suitable source 108 as indicated in Fig. 12, which compressed air is supplied to the air receiver 107 through an air strainer 109 and the air pressure regulating valve V-19 which may be adjusted to any desired pressure to provide the required upset pressure at the work W. The air strainer 109 is of the type which prevents scale or other foreign matter from entering the air system.

When air is admitted to the air cylinder 40 of the air-hydraulic power unit 35, oil is forced out of the oil cylinder 41 of the said air-hydraulic power unit 35 and flows to the oil reservoir 46. This forces the movable platen 23 to move forward and apply welding and upset pressure to the work W. When air is admitted to the oil reservoir 46, oil is forced out of the said oil reervoir 46 into the oil cylinder of the air-hydraulic power unit 35 thereby forcing the movable platen 23 into a reverse movement. The rate and control of the movement of the movable platen 23 is governed by a plurality of normally closed piston type valves V-1, V-2, V-3, V-4 and V-5 which are operated by pilot air valves V-6, V-8, V-7, V-9 and V-10, which are in turn operated by the gap closer cam 78, fast reverse cam 80, upset cam 81, feed No. 2 cam 82, feed No. 1 and slow reverse cam 83, all as indicated diagrammatically in Figs. 12-18 inclusive.

Referring now particularly to Fig. 12, the functions of the several valves and pilot valves employed will be described.

Valve V-1 is controlled by the pilot valve V-6 which is operated by the feed No. 1 and slow reverse cam 83 and admits compressed air at a controlled pressure to the air cylinder 40 of the air-hydraulic power unit 35. As soon as V-1 operates, the movable platen 23 will start to move forward as pressure is built up on the oil cylinder 41, and oil flows back to the oil reservoir 46 through feed control valve V-11. V-1 is in its operated position during all of the forward movements of the movable platen 23. V-1 is a three-way valve, and, in its normally closed position, the air cylinder 40 is exhausted to the atmosphere.

Valve V-2 is controlled by the pilot valve V-7 which is operated by the feed No. 1 and slow reverse cam 83 and admits compressed air at line pressure into the oil reservoir 46 forcing oil from the oil reservoir 46 into the air cylinder 40, thus giving a reverse movement to the movable platen 23. V-2 is in its operated position during all of the reverse movements of the movable platen 23. V-2 is a three-way valve, and, in its normally closed position, the air in the oil reservoir 46 is exhausted to the atmosphere.

Valve V-3 is controlled by the pilot valve V-8 and permits an unrestricted flow of oil, in either direction, between the oil cylinder 41 and the oil reservoir 46. V-3 is in its operated position during the time the upset cam 81 and the fast reverse cam 80 actuates V-8.

Valve V-4 is controlled by the pilot valve V-9 which is operated by the feed No. 2 cam 82 and passes a flow of oil, controlled by the feed control valve V-12, from the oil cylinder 41 of the air-haydraulic power unit 35 to the oil reservoir 46. The oil which flows through the feed control valve V-12 is in addition to the oil that flows through feed control valve V-11 so that when V-9 is operated by the feed No. 2 cam 82 the combined settings of both feed control valves V-11 and V-12 determine the speed of the movable platen 23. V-4 is in its operated position during the time the feed No. 2 cam actuates V-9.

Valve V-5 is controlled by the pilot valve V-10 and passes a flow of oil, controlled by V-13, from the oil cylinder 41 of the air-hydraulic power unit 35 to the oil reservoir 46. V-5 is in its operated position during the time the gap closer cam 78 actuates V-10.

V-6, V-7, V-8, V-9 and V-10 are cam operated three-way air valves and serve as pilot valves for the main valve spools of V-1, V-2, V-3, V-4 and V-5. The cam operation of V-6, V-7, V-8, V-9 and V-10 by the feed No. 1 and slow reverse cam 83, upset cam 81, fast reverse cam 80, feed No. 2 cam 82, and the gap closer cam 78 provide proper operating sequence and functioning of the welding machine as hereinafter described.

V-11 and V-12 are adjustable flow control type valves which fully compensate for pressure and viscosity variations.

V-13 is an adjustable needle valve which is employed to control the speed of the movable platen 23 when the gap closer cycle and function of the welding machine is employed.

V-14 is an adjustable needle valve which controls the speed of the platen for the slow reverse cycle of the movable platen 23.

V-15, V-16, V-17 and V-18 are check valves employed to control the direction of the flow of oil in various portions of the hydraulic circuit.

V-19 is an air pressure regulating valve which determines the amount of upset pressure. Depending upon the air pressure in the system and the area of the air head 44 of the dual piston and ratio of the arms of the double lever 43, for example, V-19 may be set so that each 5 pounds of pressure registered on the air pressure gauge 110 represents approximately 1500 pounds of pressure on the work W.

In an air-hydraulic system such as employed in the air-hydraulic power unit 35 and the controls thereof, it is inevitable that the air will pick up a certain amount of oil and that a certain amount of leakage will be encountered in valves, etc. To prevent the escape of this oil, a drain and exhaust system is provided with check valves V-16 and V-17 which are so connected in the system that there is alternate suction and pressure at each stroke of the air-hydraulic power unit 35, see Fig. 12. Oil is scavenged on the suction part of the stroke and is returned to the oil reservoir 46 on the pressure part of the stroke. An exhaust filter 111 is provided to separate oil from the exhaust air, and, the oil separated by this filter is returned to the system through the check valve V-18.

Figures 18, 19:
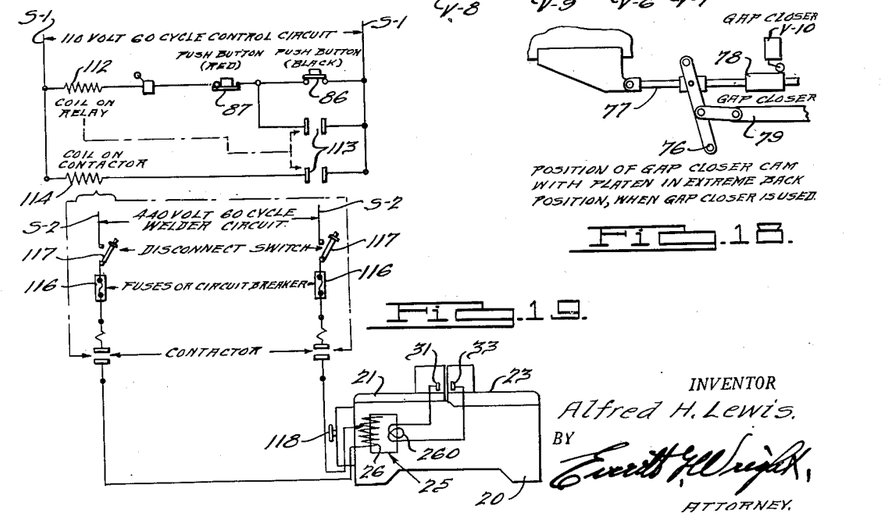
Fig. 18 is a diagrammatic plan view showing the gap closer cam in relation to the gap closer pilot valve when the platen is in its extreme back position.
Fig. 19 is a diagram of the welding circuit and the control circuit for the welding circuit preferably employed.

Referring now particularly to Fig. 19, a 110 volt electric control circuit is preferably employed to make and break the 440 volt welder circuit. Alternating current from a 110 volt source S-1 energizes the relay coil 112 which closes the relay contactors 113 whereupon a contactor coil 114 closes contactors 115 in the 440 volt welder circuit connected to a 440 volt alternating current source S-2 through suitable fuses 116 or a current breaker and through a suitable disconnect switch 117. The welder circuit applies 440 volt alternating current to the primary winding 26 of the welding transformer 25 through a selector switch 118 by means of which the welding current out-put of the secondary winding 260 of the welding transformer 25 is controlled. As indicated in Fig. 19, the secondary winding 260 of the welding transformer 25 is connected to electrodes 31 and 33 on the fixed platen 21 and the movable platen 33 as hereinbefore described. The relay coil 112 which closes the relay contactors 113 is connected in series with the current cut-off limit switch 85 operated by the current cut-off cam 84, with a normally closed red emergency "shut-off" push button 87 and with a normally open black "start" push button 86.

Figure 1:
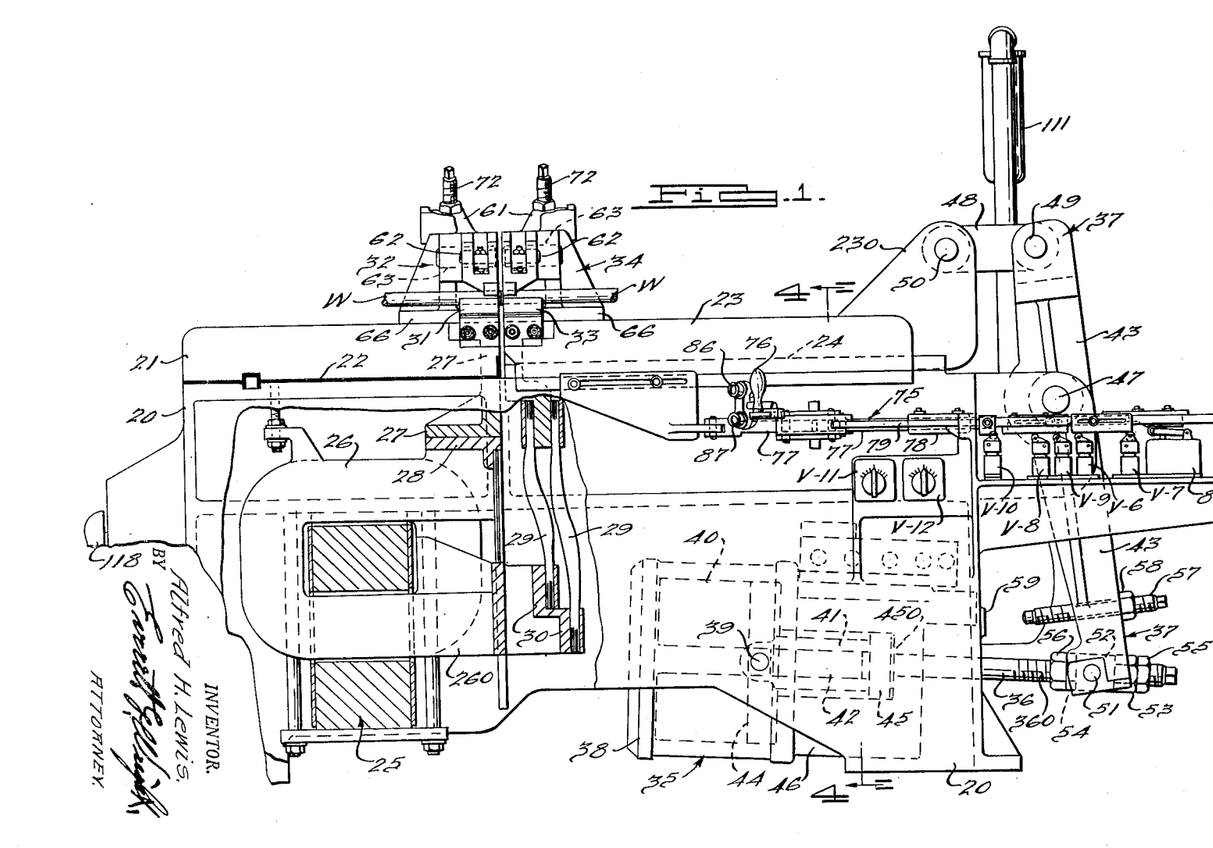
Fig. 1 is a side elevational view of a flash welder embodying the invention.
Figure 2:
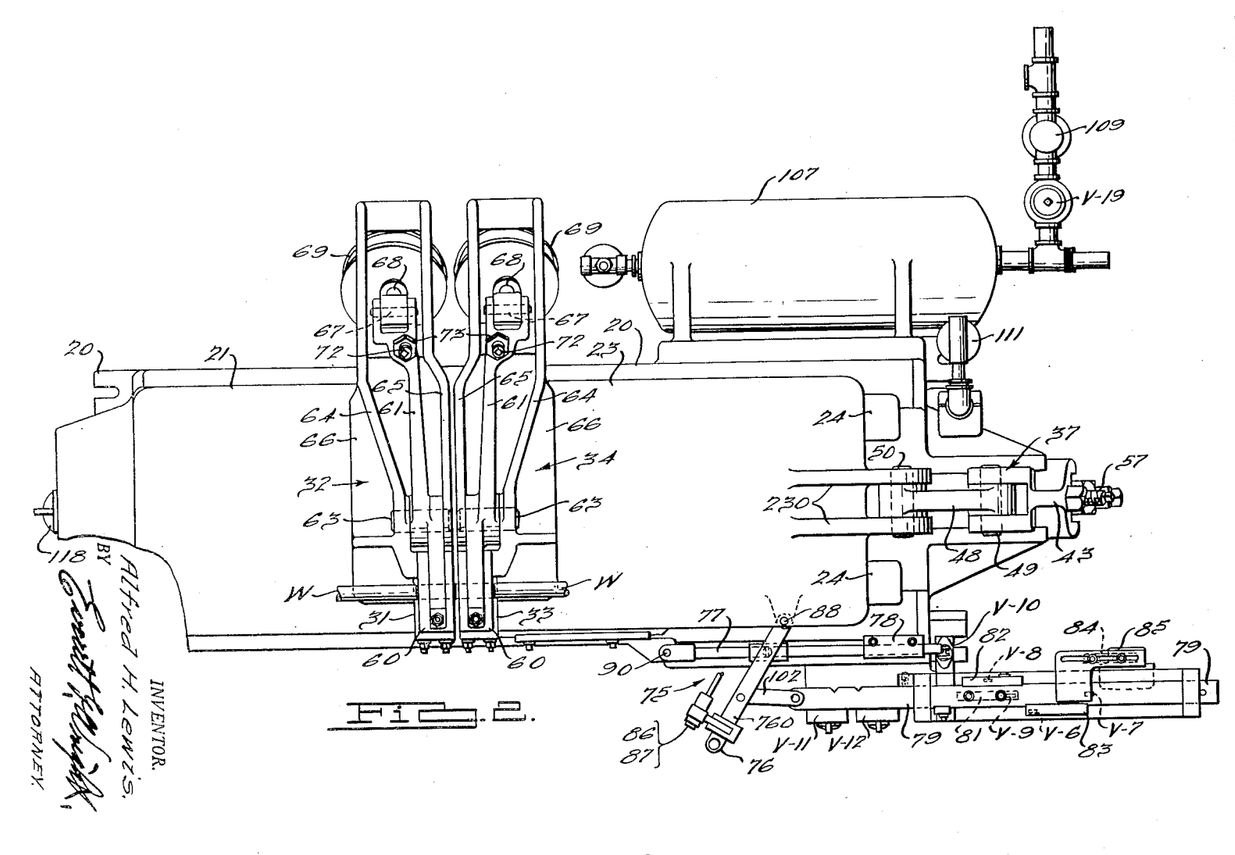
Fig. 2 is a top plan view.
Figures 2, 11:
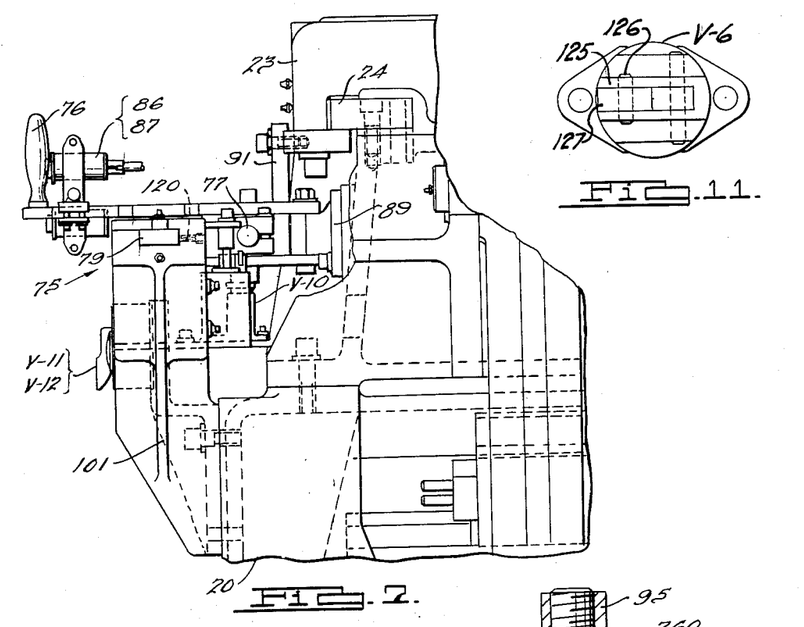
Fig. 11 is a top plan view of one of the several cam operated pilot valves employed in the welding control mechanism.
Figures 3, 4:
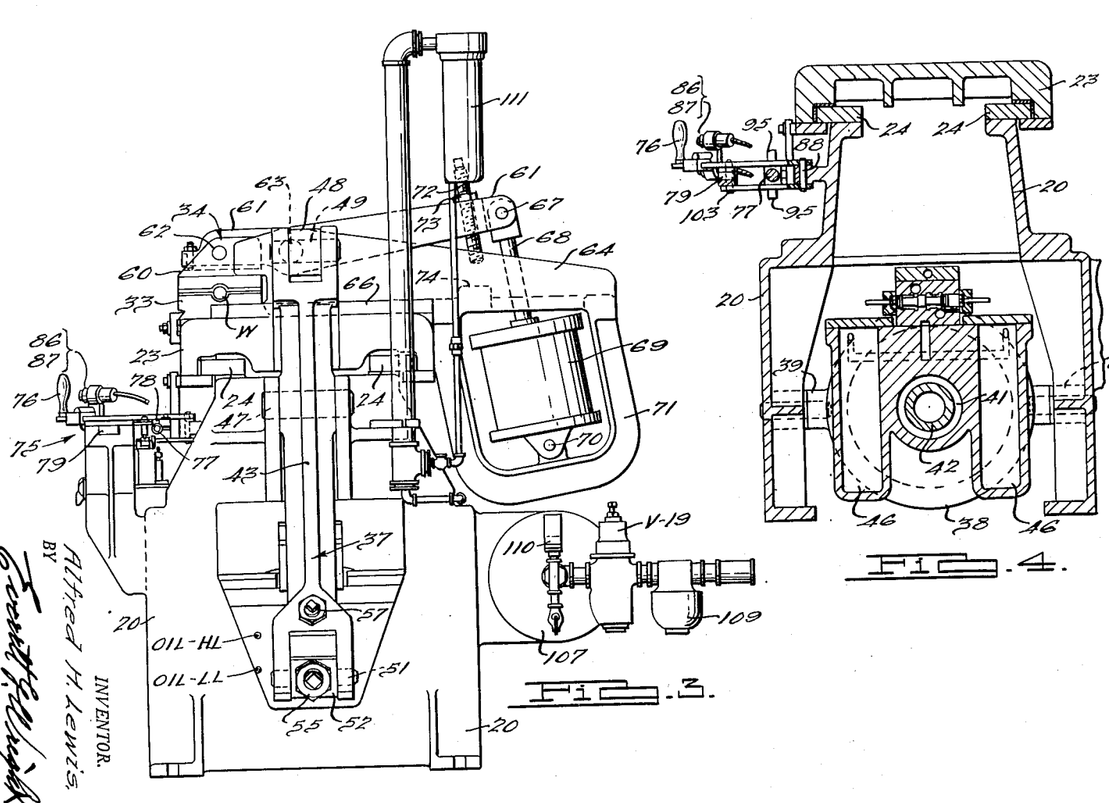
Fig. 3 is an end elevational view.
Fig. 4 is a cross sectional view taken on the line 4—4 of Fig. 1.

As shown in Figs. 2, 5 and 10, the rear of the sliding cam bar 79 is provided with a plurality of notches 119 into which the spring loaded ball detent 120 mounted in the block 99 of the base 20 will engage whereby to arrest the manual movement of the operating lever 76 in its slow reverse and neutral positions. The groove 97 in the swinging cam bar 77 is located to arrest the manual movement of the operating lever 76 in its feed #1 position. This gives the operator the proper "feel" in operating the machine when operated manually or semi-automatically.

In the operation of the welding machine, work W to be welded together is first loaded into the work holding means 32 and 34 which are carried by the fixed platen 21 and the movable platen 23 and which clamp the work W to the electrodes 31 and 33 respectively. The operating lever 76 is in neutral position, all valves of the welding machine control system are closed, compressed air from the compressed air source 108 is available to the welding machine control system, the current disconnect switch 115 is closed, and the movable platen 23 is its extreme reverse or extended position with respect to the fixed platen 21.

The operator first pushes the "start" push button 86 which causes current to flow through the welding transformer 25 to the work W.

The operator then moves the operating lever 76 to feed No. 1 position whereupon the automatic controls of the welding machine take over, however, always subject to interruption by the operator through manual movement of the operating lever 76. In the No. 1 feed position, the pilot valve V-6 is opened by the feed No. 1 and slow reverse cam 82, see Fig. 15, which is the starting feed of the work W carried by the movable platen 23 to the work W fixed to the fixed platen 21. In the No. 1 feed cycle, the contact between the two pieces of work W being welded together is accomplished relatively slowly permitting the use of lower welding voltage and causing the burning off of high spots by local heating with the expelling of the flash without weld sticks and the consequent loss of machine and operator time.

Figures 16, 17:
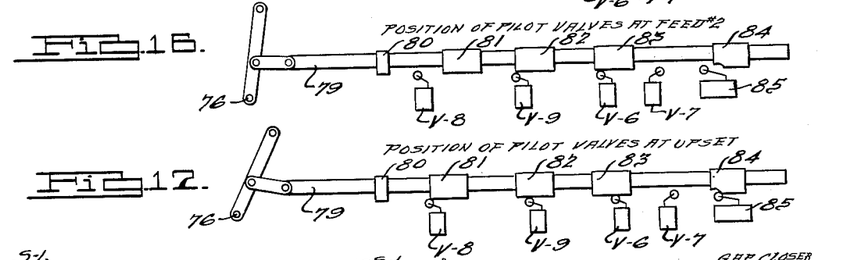
Fig. 16 is a diagrammatic view showing the welding control cam bar and pilot valves at feed No. 2 position.
Fig. 17 is a diagrammatic view showing the welding control cam bar and pilot valves at upset position.

As the movable platen 23 moves toward the fixed platen 21, the feed No. 2 cam 82 opens the pilot valve V-9, see Fig. 16, whereupon the movable platen 23 moves at a more rapid rate of speed toward the fixed plate 21 causing a faster flash feed between the work W which results in better weld quality than if the weld were completed at the slower feed required for starting weld when ends of the work W are cold. During the feed No. 2 cycle, the pilot valve V-6 is held open by the feed No. 1 and slow reverse cam 83.

Further, as the movable platen 23 moves toward the fixed platen 21, the upset cam 82 opens the pilot valve V-8, see Fig. 17, whereupon the movable platen 23 continues to move toward the fixed platen 21 at a still higher rate of speed causing the work W to be upset while welding current is continued to be applied. As before described, the upset pressure is controlled by V-19 which is an air pressure regulating valve that controls the amount of air pressure in the air-hydraulic control system and hence controls the amount of upset pressure on the weld between the work W. The valve V-3 is opened by the pilot valve V-8 which permits an unrestricted flow of oil from oil cylinder 41 which controls the movement of the movable platen 23 whereby to give the weld an extremely high upset speed which is very important in the quality of the weld.

As the movable platen 23 moves the fixed platen 21 during the upset cycle of the welder operation, the current cut-off cam 84 trips the current cut-off limit switch 85 and cuts off the welding current at the desired point in the upset cycle. The welding current cut-off at the proper time in the upset cycle is of great importance in obtaining excellent quality welds. The extent of the upset is preferably controlled by the adjustment of the upset pressure and the timing of the cut-off of the welding current, both the upset pressure and the timing of the welding current cut-off being accomplished in the set-up of work on the welding machine and the adjustment of the air pressure regulating valve V-19. When exact length of completely welded work W is desired the head flange 450 of the oil head 45 of the dual piston 42 acting against the inside of the end of the oil cylinder 41 serves as a stop, thus limiting the amount of travel of the movable platen 23 during the upset cycle.

The work W is now unloaded from the work holding means 32 and 34.

The operating lever 76 is then moved manually to fast reverse position causing both the feed No. 1 and slow reverse cam 83 to open the pilot valve V—7 and the fast reverse cam 80 to open the pilot valve V—8 whereupon the movable platen 23 returns rapidly to its extended position with respect to the fixed platen 21. The extended position of the platen 23 is limited by the adjustment of the adjustable stop 57 carried by the double lever 43 acting against the contact pad 59 on the welding machine base 20.

The operating lever 76 is then moved to its neutral position.

If, during the feed No. 1 or feed No. 2 cycle of operation of the welder, the weld should stick without proper flashing, then the operator will move the operating lever 76 manually to its slow reverse position whereupon the movable platen 23 will reverse its movement toward the fixed platen 21 and separate the ends of the work W a small distance whereby to permit the operator to restart the weld by again moving the operating lever 76 manually to its feed No. 1 position. By referring to Fig. 14, it will be observed that when the operating lever 76 is in its slow reverse position, the feed No. 1 and slow reverse cam 83 opens the pilot valve V-7 which causes the movable platen 23 to reverse itself and move slowly away from the fixed platen 21 thus separating the work W carried thereby.

When welding work W of a type and shape that can not be loaded into the work holding means 32 and 34 with the ends of the work W close enough together to start the weld without considerable loss of time while waiting for the movable platen 23 to move the work W carried by the movable platen 23 into contact with the work W clamped on the fixed platen 21 under the feed No. 1 cycle speed, an automatic "gap closing" cycle of operation is provided ahead of the feed No. 1 cycle. The gap closer cam 78 adjustably mounted on the swingable cam bar 77 is located thereon to open the pilot valve V-10, see Fig. 18, whereupon the movable platen 23 is moved at a rapid rate toward the fixed platen 21 until the work W almost touches, and then the feed No. 1 and slow reverse cam 83 causes the pilot valve V-6 to function and the feed No. 1 cycle hereinbefore described takes over automatically. The gap closer cam 78 may be moved out of position to eliminate the gap closer cycle of operation when not required. The gap closer cycle of operation is superimposed onto the feed No. 1 cycle of operation at the initiation thereof responsive to the operator moving the operating lever manually into feed No. 1 position. After the gap between the work W is substantially closed, the gap closer cam 83 releases the pilot valve V-19 and the feed No. 1 cycle of operation takes over.

The detailed setting up of work on the improved welding machine herein disclosed need not be described in detail inasmuch as the work set-up is obvious. The preferred operation of the improved welder is manual work loading and starting with fully automatic relatively slow feed No. 1, faster feed No. 2 and still faster upset cycles, interrupted manually at the discretion of the operator at any time, manual unloading of the work and manual return to neutral after the work has been unloaded. The gap closer cycle superimposed on the feed No. 1 cycle saves time in bringing work to substantial juxtaposition rapidly during the initial stage of feed No. 1 cycle. The feed No. 1 cycle brings the work into contact at a slow rate of advance until high spots on the work make contact, local heating takes place, and the high spots are blown off and expelled as flash. If flash does not occur during the No. 1 feed cycle, rather than complete the weld and most probably produce a defective weld, the operator may take over manually by moving the operating lever to slow reverse position whereupon the movable platen reverses, the weld is separated and the welder is ready to be re-started into the feed No. 1 cycle by the operator moving the operating lever to the feed No. 1 position. After the feed No. 1 cycle has been accomplished, the feed No. 2 cycle takes over automatically and the work is advanced together at a relatively more rapid rate for a predetermined distance. During the feed No. 2 cycle, the work is heated sufficiently for upset. The upset cycle takes over automatically from the feed No. 2 cycle and the speed of advance of the work is again increased to a very rapid rate, the welding current is cut off automatically at a pre-determined distance in the upset cycle, and the upset continues automatically at a very rapid rate to a distance regulated by the pressure under which the upset cycle of operation is set-up. If preferred on any particular job for which the welder is employed, the adjustment of the piston rod 36 in the take-up block 52 may be set so that the forward movement of the platen 23 is limited to a precise distance whereby to limit mechanically the extent of the upset of the weld. The completely welded work is removed manually from the work holding clamps, the movable platen is returned to neutral by manually moving the control handle to its fast reverse position, and, when the movable platen is completely returned, the operator moves the control handle to its neutral position whereupon the welding machine is ready to receive and weld additional work.

Although but a single embodiment of a semi-automatic welder embodying the invention has been disclosed and described in detail, it is obvious that many changes may be made in the size, shape, arrangement and details of the various elements of the invention without departing from the spirit and scope thereof as defined by the appended claims.

I claim:

1. A flash welder comprising a base, a fixed platen and a movable platen on said base including on each platen an electrode and means for clamping work to be welded together to each electrode, hydraulic means including cam operated valve control means therefor for moving the movable platen and work clamped thereon at various speeds toward and away from the said fixed platen and work clamped thereon whereby to bring the work carried thereby together in welding relationship, a welding transformer connected to the said electrodes and switch means for applying alternating current to the said transformer whereby to apply welding current to the said work, an operating lever, a lever operated cam bar movable with the said movable platen operable independent of the movement of the movable platen responsive to manual movement of the operating lever including a cam thereon initiating the said valve control means for moving the movable platen to bring the work to be welded together at a slow flash feed for a predetermined distance a cam on the said cam bar initiating the said valve control means responsive to the said movement of the movable platen causing the said hydraulic means to advance the said movable platen at a more rapid rate accomplishing a fast flash feed for a second predetermined distance, a second cam on the said cam bar initiating the said valve control means responsive to the said movement of the movable platen causing the said hydraulic means to advance the movable platen at a still more rapid rate accomplishing upset of the weld, a cam operated switch means and a cam on the said cam bar operating the same responsive to the said movement of the movable platen for cutting off the welding current at a predetermined distance during the upset of the weld, and an adjustable stop limiting the movement of the movable platen after the welding current is cut off whereby to limit the amount of upset of the weld.

2. A flash welder comprising a base, a fixed platen and a movable platen on said base including on each platen an electrode and means for clamping work to be welded together to each electrode, hydraulic means including cam operated control means therefor for moving the movable platen and work clamped thereon at various speeds toward and away from the said fixed platen and work clamped thereon whereby to bring the work carried thereby together in welding relationship, a welding transformer connected to the said electrodes and switch means for applying alternating current to the said transformer whereby to apply welding current to the said work, an operating lever, a lever operated cam movable responsive to manual movement of the operating lever initiating the means for moving the movable platen whereby to bring the work to be welded together at a slow flash feed for a predetermined distance, cam means movable responsive to the said movement of the movable platen initiating the said cam operated control means whereby to advance the said movable platen at a more rapid rate accomplishing a fast flash feed for a second predetermined distance, a cam means movable responsive to the said movement of the movable platen initiating the said cam operated control means whereby to advance the movable platen at a still more rapid rate accomplishing upset of the weld, cam operated switch means for cutting off the welding current, cam operated means initiated responsive to the said movement of the movable platen contacting the said cam operated switch means whereby to cut the welding current at a predetermined distance during the upset of the weld, and an adjustable stop limiting the movement of the movable platen after the welding current is cut off whereby to limit the amount of upset of the weld, cam means initiating the said control means for reversing the movement of the said movable platen, the said operating lever being manually movable to initiate the said control means for reversing the movement of the said movable platen at any time during the welding cycle whereby to separate an unfinished weld or to return the platen to its starting position after a weld has been completed and the work welded together has been removed from the electrodes.

3. A flash welder comprising a base, a fixed platen and a movable platen on said base including on each platen an electrode and means for clamping work to be welded together to each electrode, hydraulic means including cam operated valve control means therefor for moving the movable platen and work clamped thereon toward the fixed platen at slow flash feed, fast flash feed and high upset speed and away from the said fixed platen and work clamped thereon at slow reverse and fast reverse speeds whereby to bring the work carried thereby together in welding relationship and to part the same or return the movable platen to its starting position, a welding transformer connected to the said electrodes and means for applying alternating current to the said transformer whereby to apply welding current to the said work, an operating lever, a lever operable cam bar including a plurality of cams thereon selectively actuating said valve control means movable with the said movable platen, the said cam bar also being movable responsive to manual movement of the operating lever independent of the movable platen for initiating the welding cycle including initiating movement of the movable platen to bring the work to be welded together at a slow flash feed for a predetermined distance, cam operated means initiated by a cam on the said cam bar responsive to the said movement of the movable platen advancing the said movable platen at a fast flash feed for a second predetermined distance, a second cam operated means initiated by a cam on the said cam bar responsive to the said movement of the movable platen advancing the movable platen at a high upset speed to accomplish upset of the weld, and cam operated means initiated by a cam on the said cam bar responsive to the said movement of the movable platen for cutting off the welding current at a predetermined distance during the upset of the weld, a stop limiting the movement of the movable platen after the welding current is cut off whereby to limit the amount of upset of the weld, and cam operated means operable by cams on the said cam bar responsive to manual movement of the operating lever for reversing the movement of the said movable platen at slow reverse and fast reverse speeds at any time during or after the welding cycle.

4. In a flash welder, a base, a fixed platen and a movable platen on said base and hydraulic means including a plurality of cam operated hydraulic control means therefor for moving the said movable platen at various speeds forward toward and reversedly away from the said fixed platen, each platen including thereon an electrode and means for clamping work to be welded together to each electrode, means for applying welding current to each electrode, a manually movable cam means for initiating one of the said cam operated control means whereby to move the movable platen toward the fixed platen, other cams movable wth the movable platen toward the fixed platen initiating other of the cam operated control means whereby to successively increase the speed thereof, a stop limiting the movement of the movable platen toward the fixed platen, means for cutting off the welding current prior to the completion of the movement of the said movable platen toward the fixed platen, the said manually movable cam means initiating the forward movement of the said movable platen including therewith manually movable cam means initiating other of the cam operated control means whereby to reverse the movement of the said movable platen at any time during and after the completion of the forward movement of the said movable platen.

5. In a flash welder, a base, a fixed platen and a movable platen on said base and means for moving the said movable platen forward toward and reversely away from the said fixed platen, each platen including thereon an electrode and means for clamping work to be welded together to each electrode, means for applying welding current to each electrode, a manual control lever, a cam bar connected to and movable at all times by the said manual control lever, means releasably coupling the said cam bar to the movable platen for moving the said cam bar responsive to the movement of the movable platen, a plurality of cams adjustably fixed on the said cam bar, cam operated means engageable by one of the cams on the said cam bar responsive to manual movement of the manual control lever for initiating the said means for moving the movable platen toward the fixed platen, cam operated means engageable by another of the cams on the said cam bar when the said cam bar is moved responsive to the movement of the movable platen toward the fixed platen for successively increasing the speed thereof, a stop limiting the movement of the movable platen toward the fixed platen, cam operated means engageable by another of the cams on the said cam bar when the said cam bar is moved responsive to the movement of the movable platen toward the fixed platen for cutting off the welding current prior to the completion of the movement of the said movable platen toward the fixed platen, cam operated means engageable by other of the cams on the said cam bar when the said cam bar is moved responsive to the movement of the operating lever for reversing the movement of the said movable platen at any time during and after the completion of the forward movement of the said movable platen, a stop limiting the extent of reverse movement of the movable platen, the adjusted location of the said cams on the said cam bar providing selected distances of travel of the movable platen by the several said cam operated means and the timing of the welding current cut-off.

6. In a flash welder, a base, a fixed platen and a movable platen on said base and means for moving the said movable platen forward toward and reversedly away from the said fixed platen, each platen including thereon an electrode and means for clamping work to be welded together to each electrode, means for applying welding current to each electrode, a manual control lever, a slidable cam bar connected to and movable at all times by the said manual control lever, a second cam bar releasably coupling the said cam bar to the movable platen for moving the said cam bar responsive to the movement of the movable platen, a plurality of cams adjustably fixed on the said cam bar, a cam adjustably fixed on the said second cam bar, cam operated means engageable by one of the cams on the said cam bar responsive to manual movement of the manual control lever for initiating the said means for moving the movable platen toward the fixed platen, cam operated means engageable by other of the cams on the said cam bar when the said cam bar is moved responsive to the movement of the movable platen toward the fixed platen for successively increasing the speed thereof, cam operated means engageable by the cam on the said second cam bar responsive to the initial movement of the movable platen toward the fixed platen for moving the said movable platen at a speed that will close the gap between the work rapidly prior to contact therebetween, a stop limiting the movement of the movable platen toward the fixed platen, cam operated means engageable by another of the cams on the said cam bar when the said cam bar is moved responsive to the movement of the movable platen toward the fixed platen for cutting off the welding current prior to the completion of the movement of the said movable platen toward the fixed platen, cam operated means engageable by other of the cams on the said cam bar when the said cam bar is moved responsive to the movement of the operating lever for reversing the movement of the said movable platen at any time during and after the completion of the forward movement of the said movable platen, a stop limiting the extent of reverse movement of the movable platen, the adjusted location of the said cams on the said cam bar providing selected distances of travel of the movable platen by the several said cam operated means and the timing of the welding current cut-off.

7. In a flash welder, a base, a fixed platen and a movable platen on said base including on each platen an electrode and means for clamping work to be welded together to each electrode, a welding transformer connected to the said electrodes and means for applying alternating current to the said transformer whereby to apply welding current to the said work, hydraulic means for moving the movable platen toward the fixed platen continuously at progressively increased speeds whereby to accomplish slow flash feed, fast flash feed and upset of the weld successively, a series of cam operated means initiating the said hydraulic means for moving the movable platen toward the fixed platen at slow flash speed and then increasing the speed thereof to fast flash speed and again increasing the speed thereof to upset speed, air operated means for separating the movable platen from the fixed platen at slow reverse and fast reverse speeds, cam operated means initiating the said air operated means for separating the movable platen from the fixed platen at slow and fast reverse speeds, a cam bar including thereon a series of cams adjustably fixed thereon engageable with each of the said cam operated means, a manual operating lever pivoted to the welding machine base adapted to move the said cam bar into operating engagement with the cam operated means initiating the said means for moving the movable platen at slow flash speed and with the cam operated means for separating the movable platen from the fixed platen at slow and fast reverse speeds, and swingable means adjustably connected to the said movable platen engaging the said operating lever whereby to move the said cam bar responsive to the movement of the movable platen into operating engagement with the said cam operated means for moving the movable platen at fast flash speed and upset speed successively after the said manual initiation of the movement of the movable platen at slow flash speed by manual movement of the operating lever, the said operating lever being movable manually at all times with respect to the said swingable means.

8. In a flash welder, a base, a fixed platen and a movable platen on said base including on each platen an electrode and means for clamping work to be welded together to each electrode, a welding transformer connected to the said electrodes and means for applying alternating current to the said transformer whereby to apply welding current to the said work, hydraulic means for moving the movable platen toward the fixed platen continuously at a rapid rate then at a relatively slow rate and then at progressively increased speeds whereby to substantially close the gap rapidly between the movable platen and the fixed platen and then accomplish slow flash feed, fast flash feed and upset of the weld sucessively, a series of cam operated means initiating the said hydraulic means for moving the movable platen toward the fixed platen at gap closing speed, then at slow flash speed and then increasing the speed thereof to fast flash speed and again increasing the speed thereof to upset speed, air operated means for separating the movable platen from the fixed platen at slow reverse and fast reverse speeds, cam operated means initiating the said air operated means for separating the movable platen from the fixed platen at slow and fast reverse speeds, a cam bar including thereon a series of cams adjustably fixed thereon engageable with each of the said cam operated means, a manual operating lever pivoted to the welding machine base adapted to move the said cam bar into operating engagement with the cam operated means initiating the said means for moving the movable platen at slow flash speed and with the cam operated means for separating the movable platen from the fixed platen at slow and fast reverse speeds, and a second cam bar including a cam adjustably fixed thereon engageable with the said cam operated means initiating the hydraulic means for moving the movable platen toward the fixed platen at gap closing speed, the said second cam bar being swingable and adjustably connected to the said movable platen engaging the said operating lever whereby to move the said cam bar responsive to the movement of the movable platen into operating engagement with the cam operated means for moving the movable platen at fast flash speed and upset speed successively after the said manual initiation of the movement of the movable platen at slow flash speed by manual movement of the operating lever, the said operating lever being movable manually at all times with respect to the said swingable second cam bar.

ALFRED H. LEWIS.

REFERENCES CITED

The following references are of record in the file of this patent:

UNITED STATES PATENTS

| Number | Name | Date |
|---|---|---|
| 1,892,208 | Ferris et al. | Dec. 27, 1932 |
| 1,957,759 | Coates et al. | May 8, 1934 |
| 2,373,226 | Coates | Apr. 10, 1945 |

FOREIGN PATENTS

| Number | Country | Date |
|---|---|---|
| 280,659 | Great Britain | Mar. 24, 1927 |